United States Patent
She et al.

(10) Patent No.: US 10,367,654 B2
(45) Date of Patent: Jul. 30, 2019

(54) NETWORK DESIGN METHOD FOR ETHERNET RING PROTECTION SWITCHING

(71) Applicant: FUJITSU LIMITED, Kawasaki-Shi, Kanagawa OT (JP)

(72) Inventors: Qingya She, Allen, TX (US); Weisheng Xie, Plano, TX (US); Qiong Zhang, Plano, TX (US); Kirsten Rundberget, Richardson, TX (US)

(73) Assignee: FUJITSU LIMITED, Kawasaki (JP)

( * ) Notice: Subject to any disclaimer, the term of this patent is extended or adjusted under 35 U.S.C. 154(b) by 185 days.

(21) Appl. No.: 15/650,286

(22) Filed: Jul. 14, 2017

(65) Prior Publication Data
US 2019/0020500 A1    Jan. 17, 2019

(51) Int. Cl.
| H04L 12/24 | (2006.01) |
| H04L 12/42 | (2006.01) |
| H04L 12/437 | (2006.01) |
| H04L 12/707 | (2013.01) |
| H04L 12/741 | (2013.01) |
| H04L 12/717 | (2013.01) |
| H04L 12/725 | (2013.01) |

(52) U.S. Cl.
CPC ........... *H04L 12/437* (2013.01); *H04L 12/42* (2013.01); *H04L 41/12* (2013.01); *H04L 41/145* (2013.01); *H04L 45/22* (2013.01); *H04L 45/54* (2013.01); *H04L 41/04* (2013.01); *H04L 45/30* (2013.01); *H04L 45/42* (2013.01)

(58) Field of Classification Search
CPC ..... H04L 12/437; H04L 41/145; H04L 41/12; H04L 12/42; H04L 45/54; H04L 45/22; H04L 41/04; H04L 45/42; H04L 45/30
See application file for complete search history.

(56) References Cited

U.S. PATENT DOCUMENTS

| | | | | |
|---|---|---|---|---|
| 7,006,434 | B1 * | 2/2006 | Klein | H04L 41/00 |
| | | | | 370/223 |
| 7,616,589 | B2 * | 11/2009 | Nagata | H04L 12/462 |
| | | | | 370/256 |
| 7,623,446 | B1 * | 11/2009 | Allan | H04L 1/22 |
| | | | | 370/223 |
| 7,761,006 | B2 | 7/2010 | Katagiri et al. | |
| 9,853,856 | B2 * | 12/2017 | Hu | H04L 43/0811 |
| 9,967,053 | B2 * | 5/2018 | Kim | H04J 14/0267 |
| 10,102,163 | B2 * | 10/2018 | Spiegel | H04L 12/40019 |
| 2006/0109802 | A1 * | 5/2006 | Zelig | H04L 12/42 |
| | | | | 370/258 |
| 2006/0245351 | A1 * | 11/2006 | Pande | H04L 12/1868 |
| | | | | 370/216 |
| 2007/0204068 | A1 * | 8/2007 | Oku | H04L 12/66 |
| | | | | 709/251 |

(Continued)

OTHER PUBLICATIONS

Q. She, T. Hashiguchi, K. Rundberget, W. Xie "Metro Transport, from Mesh to Hub", OFC 2017; 3 pages, 2017.

(Continued)

*Primary Examiner* — Ivan O Latorre
(74) *Attorney, Agent, or Firm* — Baker Botts L.L.P.

(57) ABSTRACT

A method and system for designing Ethernet ring protection services in a network is used to identify a major ring and sub-rings for a dual hub and spoke network architecture.

12 Claims, 11 Drawing Sheets

(56) References Cited

U.S. PATENT DOCUMENTS

| | | | | |
|---|---|---|---|---|
| 2010/0104281 A1* | 4/2010 | Dhillon | H04J 14/0227 | 398/45 |
| 2010/0128640 A1* | 5/2010 | Okamoto | H04L 45/02 | 370/255 |
| 2010/0238813 A1* | 9/2010 | Allan | H04L 12/437 | 370/252 |
| 2010/0284413 A1* | 11/2010 | Abdullah | H04L 12/437 | 370/401 |
| 2010/0290367 A1* | 11/2010 | Karandikar | H04L 12/437 | 370/256 |
| 2010/0329120 A1* | 12/2010 | Zhang | H04L 45/00 | 370/238 |
| 2011/0080915 A1* | 4/2011 | Baykal | H04L 12/42 | 370/395.53 |
| 2011/0261681 A1* | 10/2011 | Wu | H04L 12/40045 | 370/223 |
| 2012/0033666 A1* | 2/2012 | Holness | H04L 12/42 | 370/389 |
| 2012/0195314 A1* | 8/2012 | Ramanujam | G06F 15/7825 | 370/392 |
| 2013/0064102 A1* | 3/2013 | Chang | H04L 49/70 | 370/244 |
| 2013/0108259 A1* | 5/2013 | Srinivas | H04Q 3/0083 | 398/25 |
| 2013/0286893 A1* | 10/2013 | Zhu | H04L 45/64 | 370/254 |
| 2014/0006845 A1* | 1/2014 | Madaiah | H04L 45/02 | 714/4.1 |
| 2014/0064063 A1* | 3/2014 | Holness | H04L 29/14 | 370/225 |
| 2015/0117267 A1* | 4/2015 | Lih | H04L 12/437 | 370/258 |
| 2015/0372902 A1* | 12/2015 | Giorgetti | H04L 45/64 | 370/219 |
| 2016/0277209 A1* | 9/2016 | Leiba | H04L 12/437 | |
| 2018/0302807 A1* | 10/2018 | Chen | H04L 45/22 | |

OTHER PUBLICATIONS

IEEE, "Ethernet Ring Protection Overview," G. 8032 v2, Nov. 2009, Retrieved from http://www.ieee802.org/1/files/public/docs2009/liaison-parsons-itut-g8032-overview-1109.pdf; 15 pages, 2009.

D. Coudert, S. Perennes, H. Rivano, M. Voge, "Combinatorial optimization in networks with 2016 Shared Risk Link Groups", Discrete Mathematics and Theoretical Computer Science, DMTCS, vol. 18, No. 3, pp. 25, 2016; 25 pages, 2016.

M. Parandehgheibi, H. Lee, E. Modiano, "Survivable Path Sets: A New Approach to Survivability in Multilayer Networks", Journal of Lightwave Technology, vol. 32, Issue 24, pp. 4139-4150, 2014; 12 pages, 2014.

Asthana, Rachna, Yatindra Nath Singh, and Wayne D. Grover. "P-cycles: An overview." IEEE communications surveys & tutorials 12.1 (2010); 15 pages, 2010.

* cited by examiner

NETWORK DESIGN METHOD FOR ETHERNET RING PROTECTION SWITCHING

BACKGROUND

Field of the Disclosure

The present disclosure relates to communications systems and more specifically to a network design method for Ethernet ring protection switching.

Description of the Related Art

A communication network may include network elements that route packets through the network. The communication network may be an Ethernet network.

In the G.8032 recommendation promulgated by the International Telecommunication Union Telecommunication Standardization Sector (ITU-T), Ethernet ring protection (ERP) switching is described with the aim of fast protection switching for ring topologies having physical loops while ostensibly avoiding logical loops at the Ethernet layer. Logical loops adversely affect network performance and operation and are undesirable for Ethernet networks. Specifically, G.8032 avoids logical loops in an Ethernet ring network by reserving so-called Ring Protection Links (RPL), which are linked to an RPL Owner Node and an RPL Neighbor Node at each end of the ring. When the Ethernet ring network is operating normally, RPLs block network traffic to avoid logical loops from forming. When an associated physical link in the Ethernet ring network fails, the RPL is activated to transmit (i.e., unblock) network traffic by the RPL Owner Node or the RPL Neighbor Node.

SUMMARY

In one aspect, a disclosed method is for configuring networks. Based on topology information representing a network, the topology information comprising nodes and links between the nodes, the method may include identifying at least two core nodes and a major ring including the core nodes, and adding a virtual node V and virtual links to the topology information, the virtual node V connecting to the core nodes with the virtual links. For each non-core node in the topology information, the method may include identifying two diverse paths from the non-core node to the virtual node V. Then, the method may further include populating a node set $S_{nc}$ with at least some of the non-core nodes, and sorting the node set $S_{nc}$ according to a decreasing number hops of diverse paths to the virtual node V. Until the node set $S_{nc}$ is an empty set, the method may repeat a plurality of operations, given by: selecting a first non-core node K in the node set $S_{nc}$ with the greatest number of hops of diverse paths to the virtual node V, identifying a next sub-ring having two diverse paths from the first non-core node K to the virtual node V, initializing a node set $P_{nc}$ with the non-core nodes shared by the node set $S_{nc}$ and the next sub-ring, adding the first non-core node K to the next sub-ring, removing the first non-core node K from the node set $S_{nc}$ and the node set $P_{nc}$, and adding additional non-core nodes from the node set $P_{nc}$ to the next sub-ring until a termination condition for the next sub-ring is satisfied. The method may still further include causing the network to be configured with the major ring and the sub-rings.

In any of the disclosed implementations of the method, causing the network to be configured may further include configuring the major ring and the sub-rings for Ethernet ring protection switching.

In any of the disclosed implementations of the method, the termination condition may include at least one of: determining that a maximum number of non-core nodes for a sub-ring has been reached for the next sub-ring, determining that a maximum sub-ring bandwidth has been reached for the next sub-ring, and determining that the node set $P_{nc}$ is empty.

In any of the disclosed implementations of the method, populating the node set $S_{nc}$ with at least some of the non-core nodes may further include initializing the node set $S_{nc}$ as an empty set, and, until no non-core nodes remain unselected from the topology information, repeating a plurality of operations, given by: from the topology information, selecting a next non-core node N, for the next non-core node N, perform an integer division of an uplink bandwidth by a maximum sub-ring bandwidth to determine an integer quotient and a modulo, when the integer quotient for the next non-core node N is greater than zero, assign a number of quotient subrings to, and when the modulo for the next non-core node N is greater than zero, add N to the node set $S_{nc}$.

Additional disclosed aspects for configuring networks include a network management system and a network element including a processor and non-transitory computer readable memory media accessible to the processor, wherein the memory media store instructions executable by the processor to implement the method.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective element. Thus, for example, device "18-1" refers to an instance of a device class, which may be referred to collectively as devices "18" and any one of which may be referred to generically as a device "18".

Figure 1:
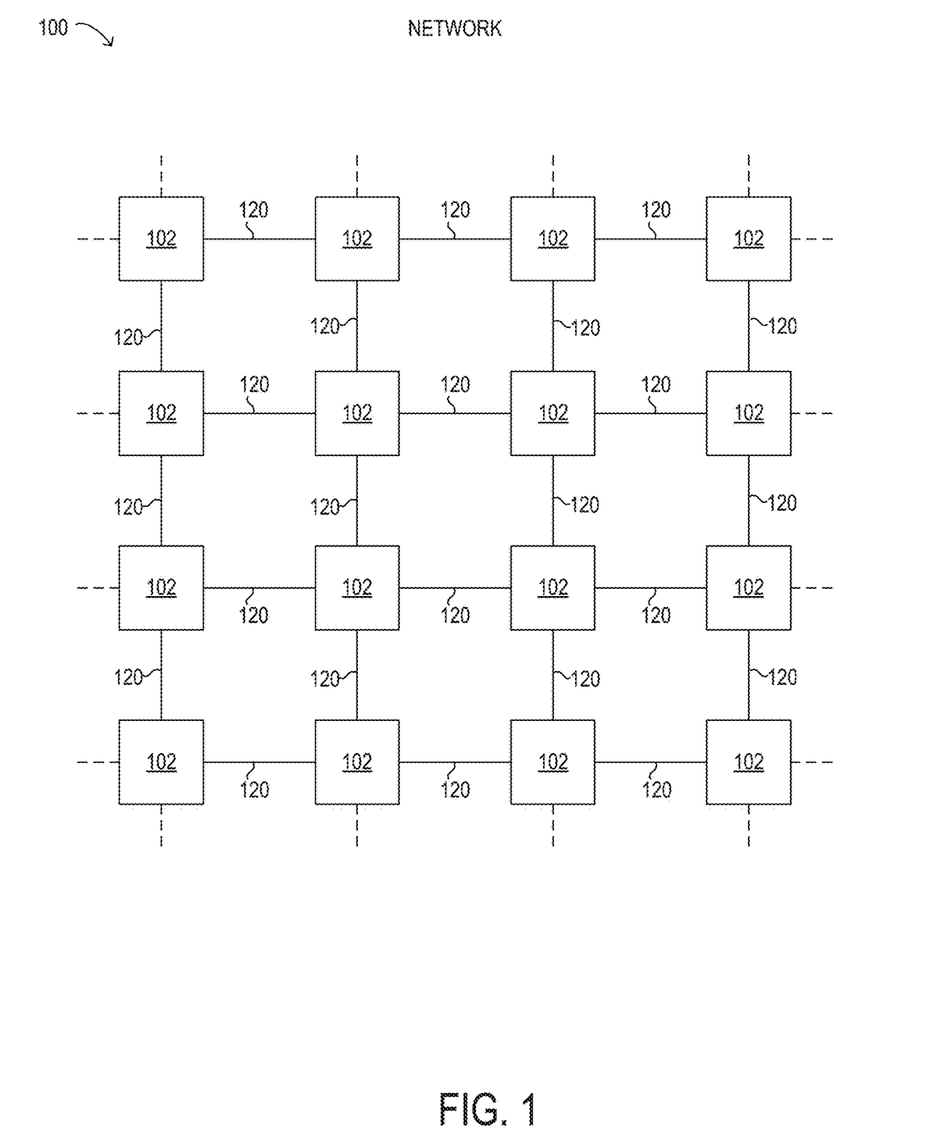
FIG. 1 is a block diagram of selected elements of an embodiment of a network.

Turning now to the drawings, FIG. 1 is a block diagram showing selected elements of an embodiment of network 100. In various embodiments, network 100 may be an Ethernet network. Network 100 includes one or more transmission media 120 operable to transport one or more signals communicated by components of network 100. The components of network 100, coupled together by transmission media 120, include a plurality of network elements 102. In the illustrated network 100, each network element 102 is coupled to four other nodes, which may represent a mesh network. However, any suitable configuration of any suitable number of network elements 102 may create network 100. Although network 100 is shown as a mesh network, network 100 may also be configured as a ring network, a point-to-point network, or any other suitable network or combination of networks. Network 100 may be used in a short-haul metropolitan network, a long-haul inter-city network, or any other suitable network or combination of networks.

Each transmission medium 120 may include any system, device, or apparatus configured to communicatively couple network devices 102 to each other and communicate information between corresponding network devices 102. For example, a transmission medium 120 may include an optical fiber, an Ethernet cable, a T1 cable, a WiFi signal, a Bluetooth signal, and/or other suitable medium.

Network 100 may communicate information or "traffic" over transmission media 120. As used herein, "traffic" means information transmitted, stored, or sorted in network 100. Such traffic may comprise optical or electrical signals configured to encode audio, video, textual, and/or any other suitable data. The data may also be transmitted in a synchronous or asynchronous manner, and may be transmitted deterministically (also referred to as 'real-time') and/or stochastically. Traffic may be communicated via any suitable communications protocol, including, without limitation, the Open Systems Interconnection (OSI) standard and Internet Protocol (IP). Additionally, the traffic communicated via network 100 may be structured in any appropriate manner including, but not limited to, being structured in frames, packets, or an unstructured bit stream.

Each network element 102 in network 100 may comprise any suitable system operable to transmit and receive traffic. In the illustrated embodiment, each network element 102 may be operable to transmit traffic directly to one or more other network elements 102 and receive traffic directly from the one or more other network elements 102.

Modifications, additions, or omissions may be made to network 100 without departing from the scope of the disclosure. The components and elements of network 100 described may be integrated or separated according to particular needs. Moreover, the operations of network 100 may be performed by more, fewer, or other components.

Figure 4A:
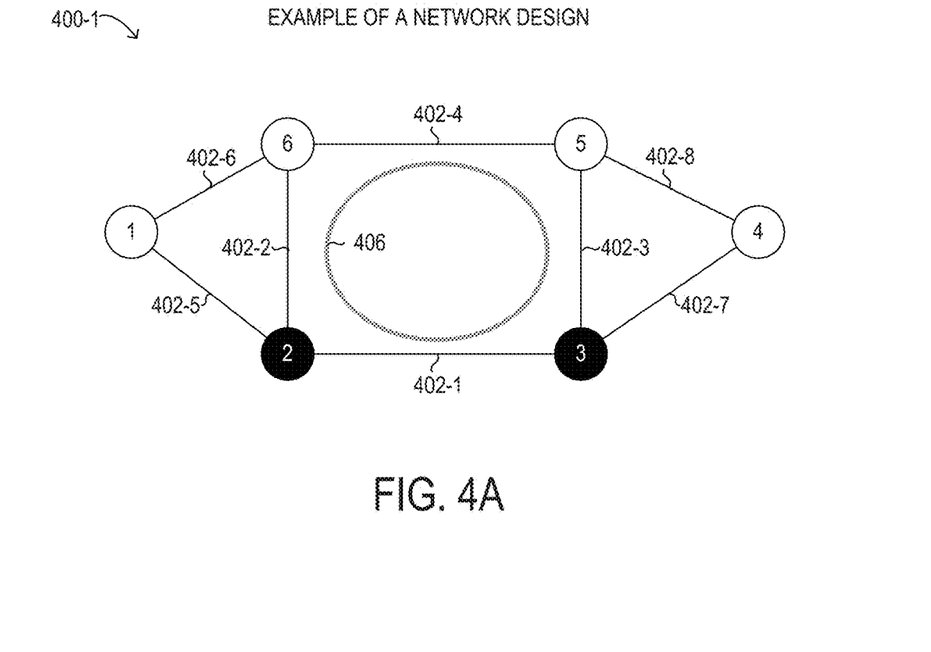
FIGS. 4A, 4B, 4C, 4D, 4E, 4F are network diagrams of selected elements of an example of a network design.
Figure 4B:
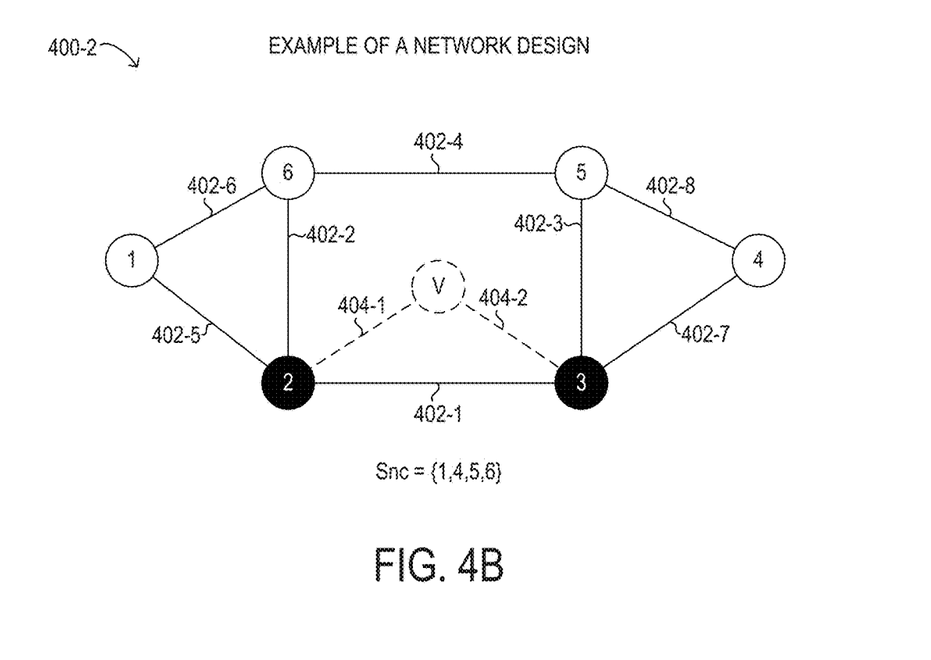
Figure 4C:
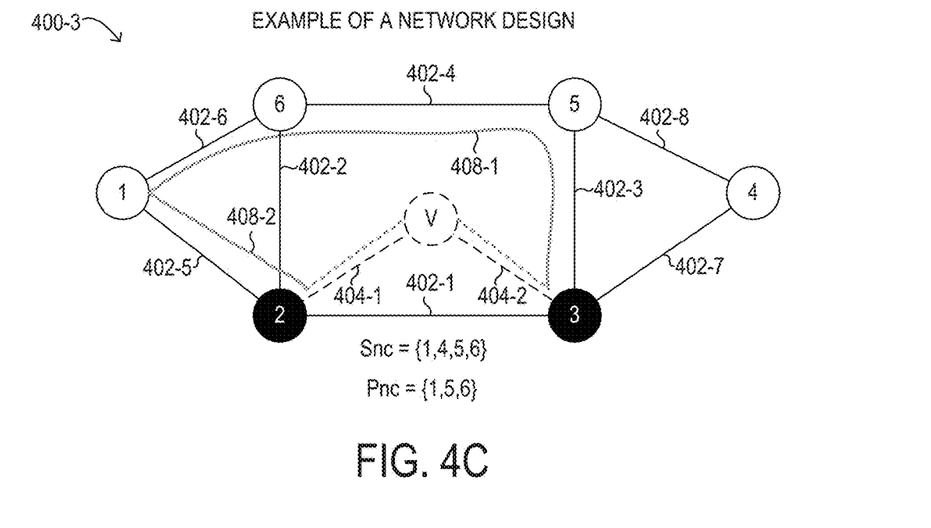
Figure 4D:
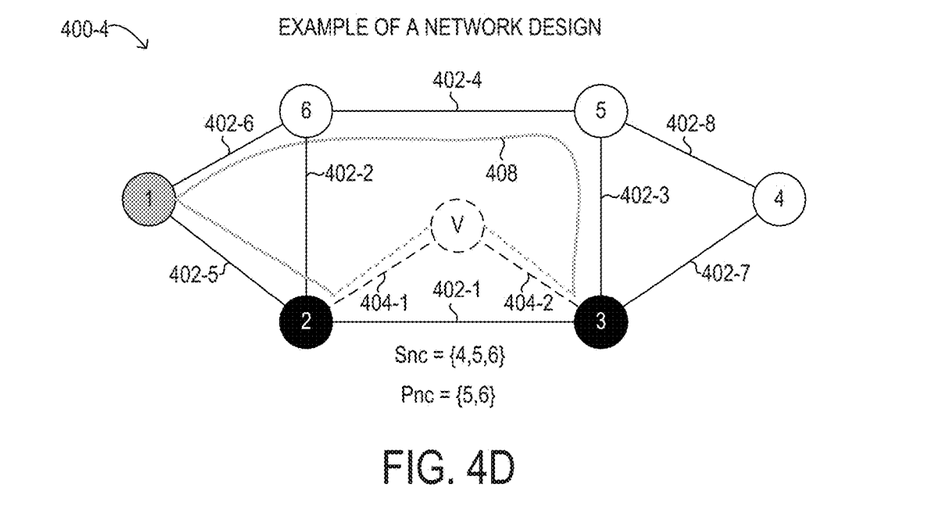
Figure 4E:
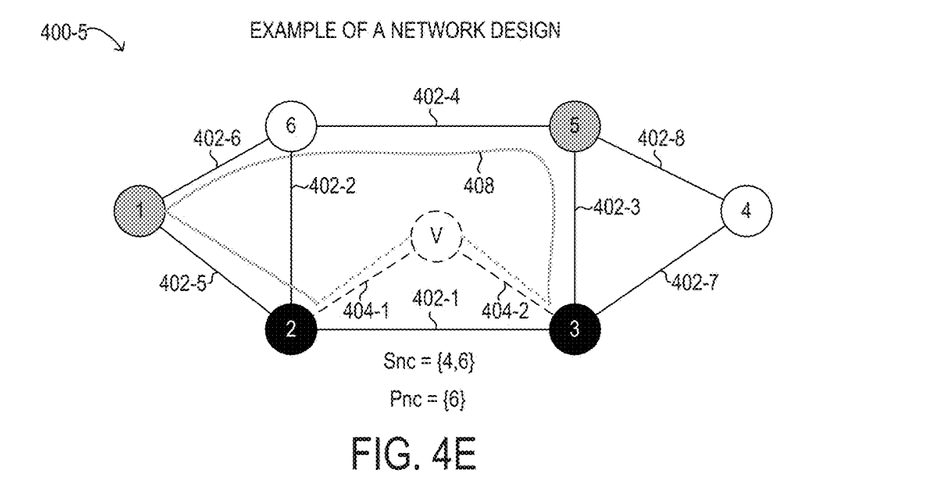
Figure 4F:
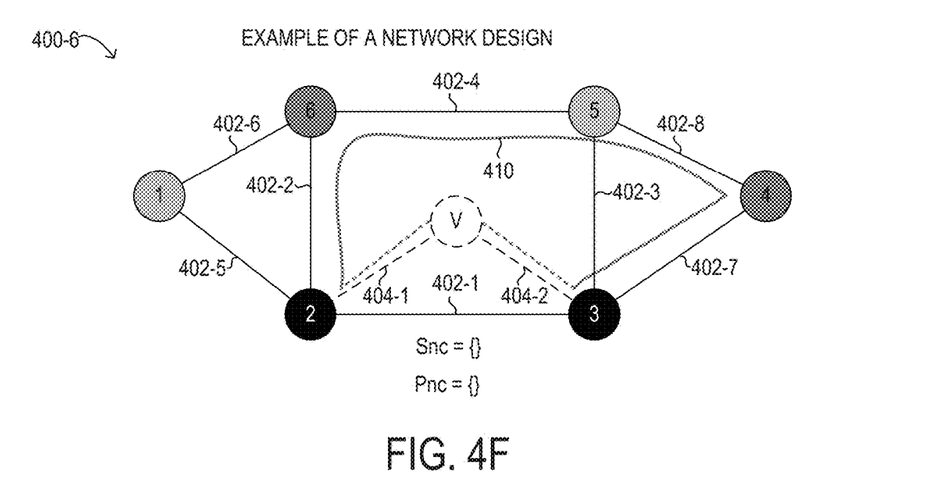
Figure 4G:
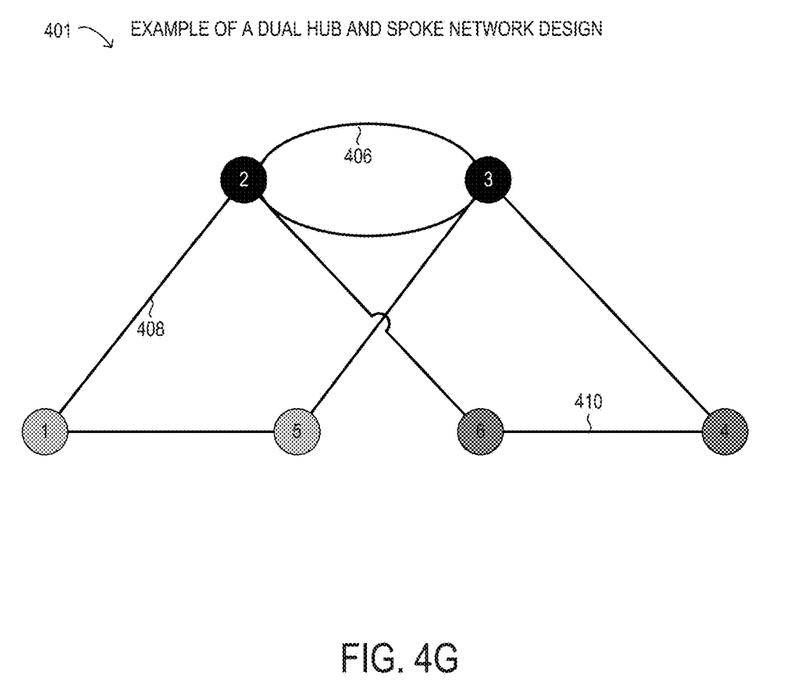
FIG. 4G is a network diagram of selected elements of an example of a dual hub and spoke network design.

As network designs evolve to support greater metropolitan traffic and incorporate new technologies, it is expected that metro network architecture will be supplanted with a so-called "dual hub and spoke" design, which is illustrated in FIG. 4G and will be described in further detail below. The benefits of the dual hub and spoke network design include improved network operation, ease of network upgrades, reduced capital expenditures, the ability to implement new network services, and improved network performance. The dual hub and spoke design may include at least two core nodes and a plurality of non-core nodes. In the dual hub and spoke design, Ethernet ring protection (ERP) may be configured according to G.8032, as described below.

Figure 2:
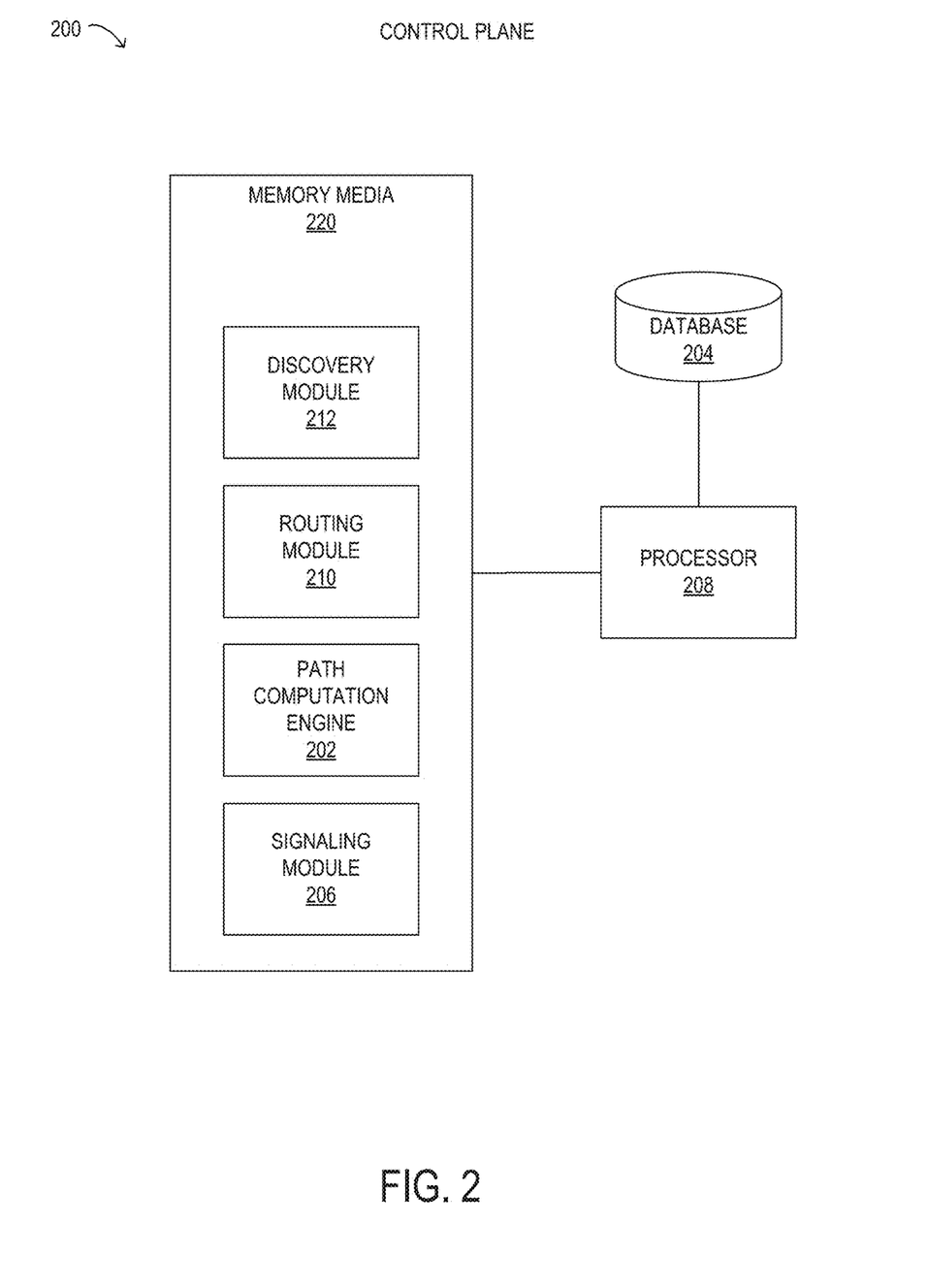
FIG. 2 is a block diagram of selected elements of an embodiment of a control plane.

Turning now to FIG. 2 a block diagram of selected elements of an embodiment of control plane 200 for implementing control plane functionality in networks, such as, for example, in network 100 (see FIG. 1), is illustrated. A control plane includes functionality for network intelligence and control and comprises applications that support the ability to establish network services, including applications or modules for discovery, routing, path computation, and signaling, as will be described in further detail. A control plane may also be referred to as a "network management system" or a "network controller" in different contexts. The control plane applications executed by control plane 200 work together to automatically establish services within network 100, which may be at least in part an optical network. Discovery module 212 discovers local links connecting to neighbors. Routing module 210 broadcasts local link information to network nodes while populating database 204. When a request for service from network 100 is received, path computation engine 202 may be called to compute a network path using database 204. This network path may then be provided to signaling module 206 to establish the requested service.

As shown in FIG. 2, control plane 200 includes processor 208 and memory media 220, which store executable instructions (i.e., executable code) executable by processor 208, which has access to memory media 220. Processor 208 may execute instructions that cause control plane 200 to perform the functions and operations described herein. For the purposes of this disclosure, memory media 220 may include non-transitory computer-readable media that stores data and/or instructions for at least a period of time. Memory media 220 may comprise persistent and volatile media, fixed and removable media, and magnetic and semiconductor media. Memory media 220 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and/or flash memory; non-transitory media; and/or various combinations of the foregoing. Memory media 220 is operable to store instructions, data, or both. Memory media 220 as shown includes sets or sequences of instructions that may represent executable computer programs, namely, path computation engine 202, signaling module 206, discovery module 212, and routing module 210. In some embodiments, path computation engine 202, in conjunction with signaling module 206, discovery module 212, and/or routing module 210, may represent instructions and/or code for implementing various algorithms according to the present disclosure.

In certain embodiments, control plane 200 may be configured to interface with a person (i.e., a user) and receive data about the signal transmission path. For example, control plane 200 may also include and/or may be coupled to one or more input devices and/or output devices to facilitate receiving data about the signal transmission path from the user and/or outputting results to the user. The one or more input and/or output devices (not shown) may include, but are not limited to, a keyboard, a mouse, a touchpad, a microphone, a display, a touchscreen display, an audio speaker, or the like. Alternately or additionally, control plane 200 may be configured to receive data about the signal transmission path from a device such as another computing device and/or a network element (not shown in FIG. 2).

As shown in FIG. 2, in some embodiments, discovery module 212 may be configured to receive data concerning a signal transmission path in a network and may be responsible for discovery of neighbors and links between neighbors. In other words, discovery module 212 may send discovery messages according to a discovery protocol, and may receive data about the signal transmission path. In some embodiments, discovery module 212 may determine features, such as, but not limited to, media type; media length; number and/or type of components; data rate; modulation format of the data; input power of an optical signal; number of optical signal carrying wavelengths (i.e., channels); channel spacing; traffic demand; and/or network topology, among others.

As shown in FIG. 2, routing module 210 may be responsible for propagating link connectivity information to various nodes within a network, such as network 100. In particular embodiments, routing module 210 may populate database 204 with resource information to support traffic engineering, which may include link bandwidth availability. Accordingly, database 204 may be populated by routing module 210 with information usable to determine a network topology of a network.

Path computation engine 202 may be configured to use the information provided by routing module 210 to database 204 to determine transmission characteristics of the signal transmission path. The transmission characteristics of the signal transmission path may provide insight on how transmission degradation factors may affect the signal transmission path. When the network is an optical network, the transmission degradation factors may include, for example: chromatic dispersion (CD), nonlinear (NL) effects, polarization effects, such as polarization mode dispersion (PMD) and polarization dependent loss (PDL), amplified spontaneous emission (ASE) and/or others, which may affect optical signals within an optical signal transmission path. To determine the transmission characteristics of the signal transmission path, path computation engine 202 may consider the interplay between various transmission degradation factors. In various embodiments, path computation engine 202 may generate values for specific transmission degradation factors. Path computation engine 202 may further store data describing the signal transmission path in database 204.

In FIG. 2, signaling module 206 may provide functionality associated with setting up, modifying, and tearing down end-to-end networks services in network 100. For example, when an ingress node in the optical network receives a service request, control plane 200 may employ signaling module 206 to request a network path from path computation engine 202 that may be optimized according to different criteria, such as bandwidth, cost, etc. When the desired network path is identified, signaling module 206 may then communicate with respective nodes along the network path to establish the requested network services. In different embodiments, signaling module 206 may employ a signaling protocol to propagate subsequent communication to and from nodes along the network path. For example, signaling module 206 may be enabled to provision ERP nodes in an ERP network, including installing or configuring ERP processes on each node in the ERP network.

According to G.8032, a non-degenerate Ethernet ring that provides link protection includes at least three ERP nodes, such that an ERP node is linked to at least two neighboring ERP nodes respectively with at least two independent ring links, which provides for link protection (i.e., redundancy) when an operating link fails. The ring links are configured using RPLs to prohibit formation of logical loops that are undesirable in an ERP network due to uncontrollable traffic forwarding that may occur over the logical loops. The rings may be major rings that are configured as a physical loop with at least three nodes and at least three independent ring links. As noted previously, an ERP network conforming with G.8032 will have at least one major ring. The rings may also include so-called 'sub-rings' having at least three nodes and at least two independent ring links.

The ring topology may be used to interconnect different ERP networks. For example, two ERP networks consisting of major rings might be interconnected using a single common node. However, such a topology is undesirable because the common node is a single point of failure for both the connected ERP networks, which increases risks of failure and also amplifies the impact of a failure of the common node. Under G.8032, a sub-ring is be connected to a major ring or another sub-ring using two common nodes, thereby enabling link protection at the two common nodes.

The RPLs are redundant links that form a physical loop but are blocked according to G.8032 to prevent a logical loop from forming. Under G.8032, the RPL may be in one of two states: idle and protecting. The idle state represents normal operation when the RPL is logically blocked and does not forward traffic, even though the physical link at the RPL is present. The idle state may indicate that no link or node faults are currently detected and that the network is operating normally. The protecting state represents a network condition to recover from a link error where the RPL is activated and forwards traffic. Thus, when an RPL is active, it may be assumed that another link in the network has failed, representing a topology change in the ERP network.

In operation, control plane 200 may be used to detect or determine nodes, links, and rings within an ERP network. The ERP network may be an existing network, such that control plane 200 communicates with network elements. In other instances, control plane 200 may process network information for a proposed network or a network design that represents a virtual network. After determination of respective numbers of the nodes, links, and rings within the ERP network, control plane 200 may be used to implement buffer flush optimization in the ERP network. In particular, control plane 200 may be enabled to implement the network design method for ERP switching, as disclosed herein.

Figure 3A:
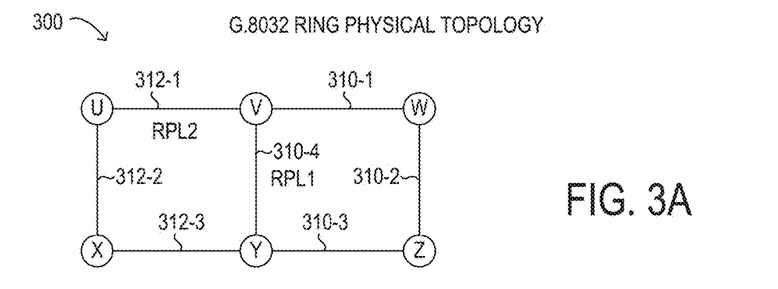
FIG. 3A is a network diagram of selected elements of a physical topology for a G.8032 ring network.

Referring now to FIG. 3A, a network diagram of selected elements of physical topology 300 for a G.8032 ring network is illustrated. As shown, physical topology 300 may represent an embodiment of network 100. In FIG. 3A, physical topology 300 includes nodes U, V, W, X, Y, Z and physical links 312, 310 in an Ethernet network. In some embodiments, an internal network-network interface (I-NNI, not shown) may be used as a secondary channel to send control messages between nodes and rings.

In physical topology 300, nodes V, W, Z, Y are a major ring that includes links 310-1, 310-2, 310-3, and 310-4. Nodes V, U, X, Y are a sub-ring connected to the major ring at nodes V and Y that includes links 312-1, 312-2, and 312-3. As will be described below with respect to FIGS. 3B, and 3C, link 310-4 may be configured as an RPL (RPL1) for the major ring, while link 312-1 may be configured as an RPL (RPL2) for the sub-ring. Because logical loops would result, physical topology 300 is not usable as a logical topology for an Ethernet network.

Figure 3B:
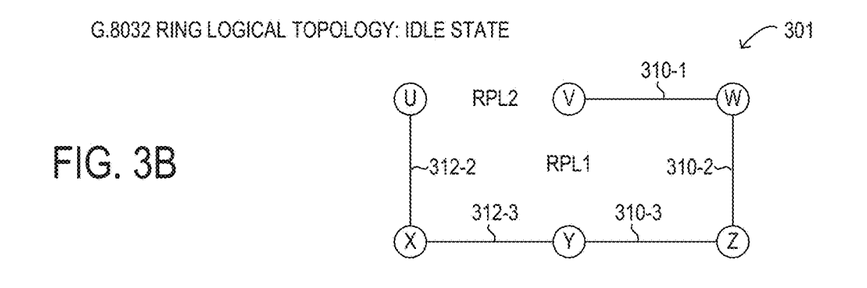
FIG. 3B is a network diagram of selected elements of a logical topology for a G.8032 ring network in an idle state.

Referring now to FIG. 3B, a network diagram of selected elements of logical topology 301 is illustrated. As shown, logical topology 301 may represent an idle state of physical topology 300 (see FIG. 3A). Specifically, logical topology 301 shows links for RPL1 and RPL2 each in an idle state and blocked for network traffic, leaving nodes U-X-Y-Z-W-V connected in a linear topology (i.e., a spanning tree that does not include logical loops) that is suitable for Ethernet network operation.

Figure 3C:
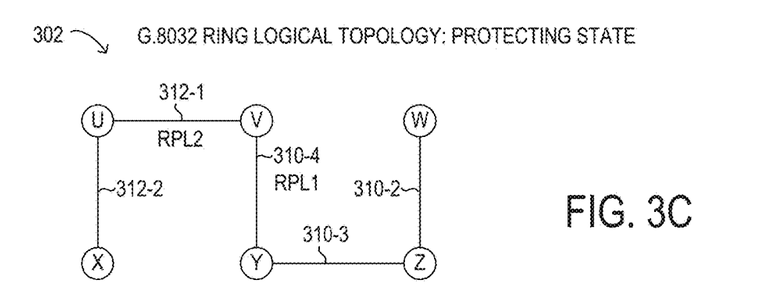
FIG. 3C is a network diagram of selected elements of a logical topology for a G.8032 ring network in a protection state.

Referring now to FIG. 3C, a network diagram of selected elements of logical topology 302 is illustrated. As shown, logical topology 302 may represent a protection state of physical topology 300 (see FIG. 3A), where links 310-1 and 312-3 have failed. Logical topology 302 shows links for RPL1 and RPL2 each in a protection state and transmitting network traffic, leaving nodes X-U-V-Y-Z-W connected in a linear topology (i.e., a spanning tree that does not include logical loops) that is suitable for Ethernet network operation. Although a dual failure for the major ring and the sub-ring are illustrated in FIG. 3B for descriptive clarity, it will be understood that RPL1 or RPL2 may individually respond to a failure and operate independently of one another in the protecting state.

Referring now to FIG. 4A, a network diagram of selected elements of an example 400-1 of a network design for ERP switching is depicted. As shown, example 400-1 may represent an embodiment of network 100, and in particular, may represent topology information including nodes and links between the nodes for a network. In example 400-1, six (6) nodes (1, 2, 3, 4, 5, 6) represent network nodes. Also, eight (8) physical links 402 are present between the 6 nodes. In example 400-1, nodes 2 and 3 are designated as core nodes (black background), while physical links 402-1, 402-2, 402-3, and 402-4 comprise a main physical links have been configured as a major ring 406. Major ring 406 and additional sub-rings configured in example 400 may be G.8032 rings, whose basic logical operation is described above with respect to FIGS. 3A, 3B, and 3C. It will be understood that other logical topologies may be implemented in different embodiments.

As will be described in further detail below with respect to FIGS. 4B through 4F, a network design method is described for configuring ERP switching (i.e., G.8032 rings) in example 400. The given conditions are a network topology comprising a plurality of nodes and links between the nodes, as shown in example 400-1. In the network topology, two core nodes (nodes 2 and 3) and a major ring (ring 406) are identified. It is noted that in various implementations, more than two core nodes may be identified. Additionally, certain assumptions about the network characteristics in example 400 may be made. For example, an uplink bandwidth representing the network traffic capacity of each non-core node to the core nodes may be assumed. A maximum number of noes in a sub-ring may be defined, as well as a maximum sub-ring bandwidth capacity for each sub-ring. Additionally, a termination condition for finding additional non-core nodes in a sub-ring may be defined when a maximum number of non-core nodes for a sub-ring has been reached for a given sub-ring, or when the maximum sub-ring bandwidth has been reached for a given sub-ring or another condition or a combination thereof. Under these assumptions, the network design method described herein may find sub-rings covering the non-core nodes such that each sub-ring can continue to provide network connectivity when any single node or link fails. Objectives of the network design method described herein may include minimizing the hops of each sub-ring and minimizing the total number of sub-rings. Accordingly, the assumptions for the example 400 described below include:

core nodes 2 and 3
non-core nodes 1, 4, 5, 6
maximum number of nodes per sub-ring=2
uplink bandwidth per non-core node=10 Gbps
maximum sub-ring bandwidth=100 Gbps In FIG. 4B, example 400-2 shows that a virtual node V has been added, along with virtual links 404-1 connecting to core node 2 and 404-2 connecting to core node 3. Then, for each non-core node, two diverse paths to the virtual node V may be identified, which will represent one diverse path including core node 2 and one diverse path including core node 3. The two diverse paths from each non-core node may be precomputed and stored, and retrieved for use in a subsequent operation. For example, a node-disjoint Suurballe algorithm may be used to obtain the two diverse paths from each non-core node to the virtual node V.

Then, a node set Snc may be populated with at least some of the non-core nodes. For example, the node set Snc may be initialized as an empty set. Then, for each non-core node N, an integer division of the uplink bandwidth for node N by the maximum sub-ring bandwidth may be performed to obtain an integer quotient and a modulo. When the integer quotient for node N is greater than zero, a number of sub-rings corresponding to the integer quotient may be assigned to node N, with a minimum of 1 sub-ring. When the modulo for node N is greater than zero, node N may be added to the node set Snc. Then, the node set Snc may be sorted according to a decreasing total number of hops of the diverse paths to the virtual node V. Accordingly, in example 400-2, Snc={1, 4, 5, 6}.

In FIG. 4C, example 400-3 shows that a first non-core node 1 has been selected and the two diverse paths to the virtual node V from node 1 are considered. A first diverse path from node 1 is path 408-1, which includes links 402-6, 402-4, 402-3 as well as virtual link 404-2. A second diverse path from node 1 is path 408-2, which includes link 402-5 and virtual link 404-1. Then, a node set Pnc is initialized with the non-core nodes shared by Snc and the sub-ring 408, resulting in Pnc={1, 5, 6}.

In FIG. 4D, example 400-4 shows that node 1 has been added to sub-ring 408 after being selected as the node in Pnc with the largest number of diverse hops to the virtual node V. The uplink bandwidth of node 1 may be added to the sub-ring bandwidth of sub-ring 408. Then, node 1 may be removed from Snc and Pnc.

In FIG. 4E, example 400-5 shows a selection of node 5 as the next node in Pnc having the largest number of diverse hops to the virtual node V. Node 5 is also added to sub-ring 408. The uplink bandwidth of node 5 may be added to the sub-ring bandwidth of sub-ring 408. Then, node 5 may be removed from Snc and Pnc. At this point, a termination condition for sub-ring 408 is reached, namely the condition that the maximum number of non-core nodes is 2 nodes. The termination condition for finding additional non-core nodes in sub-ring 408 may be given when a maximum number of non-core nodes has been reached, or when the maximum sub-ring bandwidth has been reached or when the node set Pnc is empty.

In FIG. 4F, example 400-6 shows that a second sub-ring 410 has been configured given the value of Snc={4, 6} after example 400-5 in FIG. 4E. Nodes 4 and 6 have been added to second sub-ring 410, which is complete because the maximum number of non-cure nodes=2 has been reached and Pnc is empty. Also, because Snc is also empty, the configuration of sub-rings in example 400 is complete.

In FIG. 4G, example 401 shows a logical view of the ERP rings 406, 408, and 410 configured in example 400 above. Example 401 shows the dual hub and spoke network architecture. Major ring 406 includes core nodes 2 and 3, representing the dual hub, while sub-rings 408 and 410 represent the spokes.

Figure 5A:
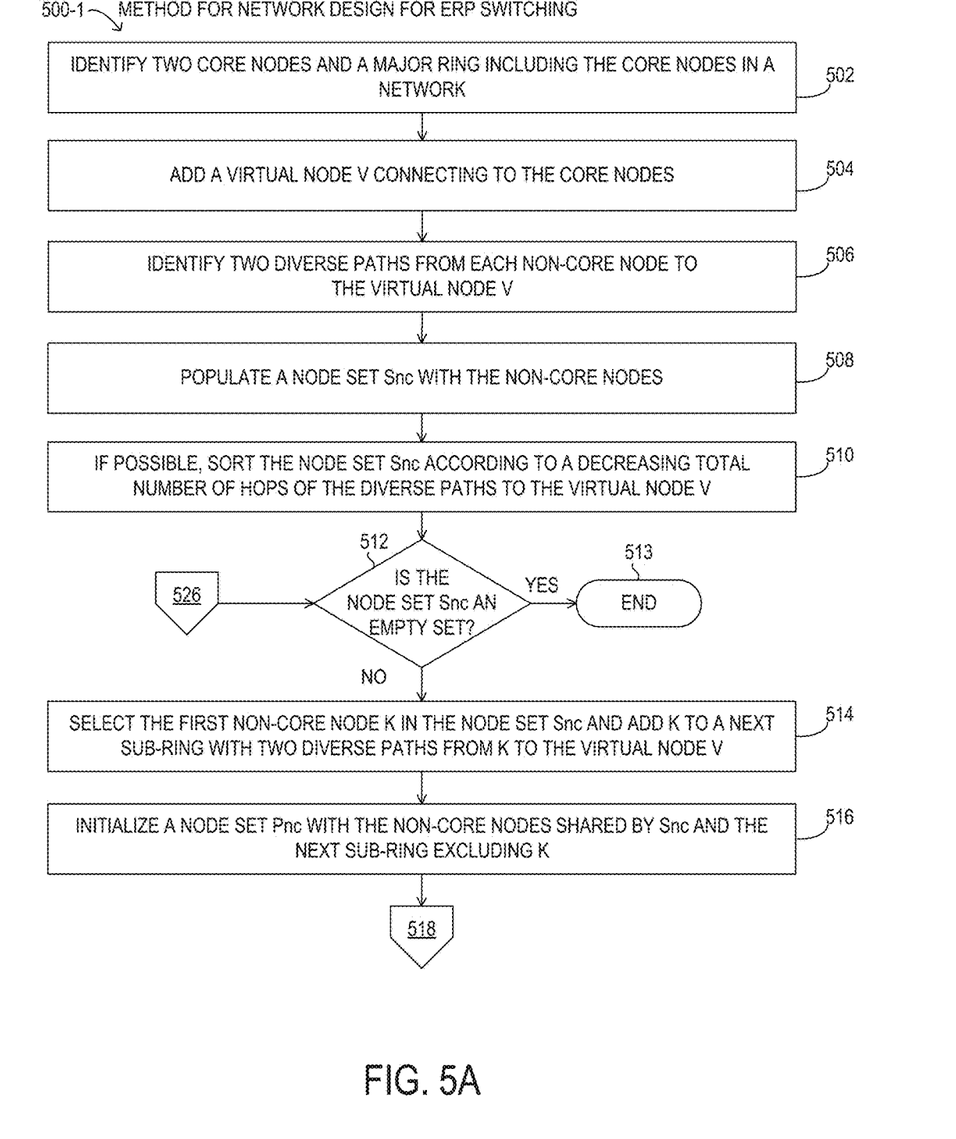
FIG. 5A is a flow chart of selected elements of a method for network design for ERP switching.
Figure 5B:
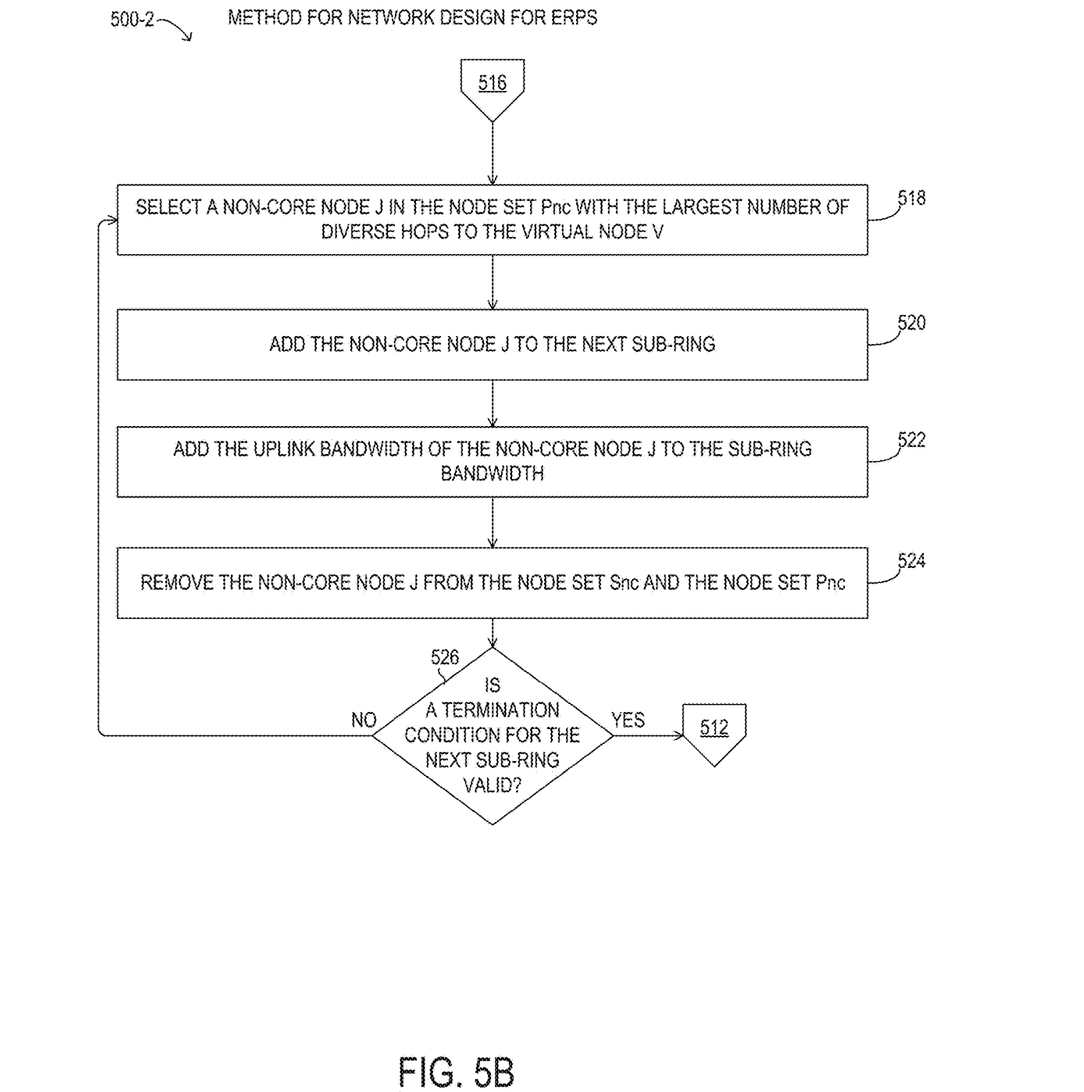
FIG. 5B is a flow chart of selected elements of a method for network design for ERP switching.

Referring now to FIGS. 5A and 5B, a flow chart of selected elements of an embodiment of method 500 for network design for ERP switching, as described herein, is depicted. In some embodiments, certain portions of method 500 may be executed by control plane 200 (see FIG. 2). It is noted that certain operations described in method 500 may be optional or may be rearranged in different embodiments.

In FIG. 5A, method 500-1 begins at step 502 by identifying two core nodes and a major ring including the core nodes in a network. For example, U.S. Pat. No. 7,761,006 discloses a method to find a major ring in a network, among other possible methods. In various implementations, more than two core nodes may be identified in step 502. At step 504, a virtual node V connecting to the two core nodes is added. At step 506, two diverse paths from each non-core node to the virtual node V are identified. At step 508, a node set Snc is populated with at least some of the non-core nodes. Method 508-1 in FIG. 6 describes an example implementation of step 508 in further detail. At step 510, if possible (e.g., when Snc is not empty), the node set Snc is sorted according to a decreasing total number of hops of the diverse paths to the virtual node V. At step 512 a decision is made whether the node set Snc is an empty set. When the result of step 512 is YES and the node set Snc is an empty set, method 500-1 may end at step 513. When the result of step 512 is NO and the node set Snc is not an empty set, at step 514 the first non-core node K in the node set Snc is selected and K is added to a next sub-ring with two diverse paths from K to the virtual node V. At step 516, a node set Pnc is initialized with the non-core nodes shared by Snc and the next sub-ring excluding K. After step 516, method 500 continues with method 500-2 in FIG. 5B. At step 526, a decision is made whether a termination condition for the next-sub ring is valid. When the result of step 526 is YES and the termination condition is valid, method 500-2 may go to step 512 in method 500-1. When the result of step 526 is NO and the termination condition is not valid, method 500-2 may loop back to step 518 to select another non-core node in the node set Pnc.

In FIG. 5B, at step 518, a non-core node J is selected in the node set Pnc with the largest number of diverse hops to the virtual node V. At step 520, the non-core node J is added to the next sub-ring. At step 522, the uplink bandwidth of the non-core node J is added to the sub-ring bandwidth. At step 524, the non-core node J is removed from the node set Snc and the node set Pnc. It will be understood that after method 500 is performed, the major ring and the sub-rings have been identified to implement ERP switching. Accordingly, a network administration entity, such as a network management system, may implement an operational configuration of the major ring and the sub-rings in the actual physical network, such as according to G.8032.

Figure 6:
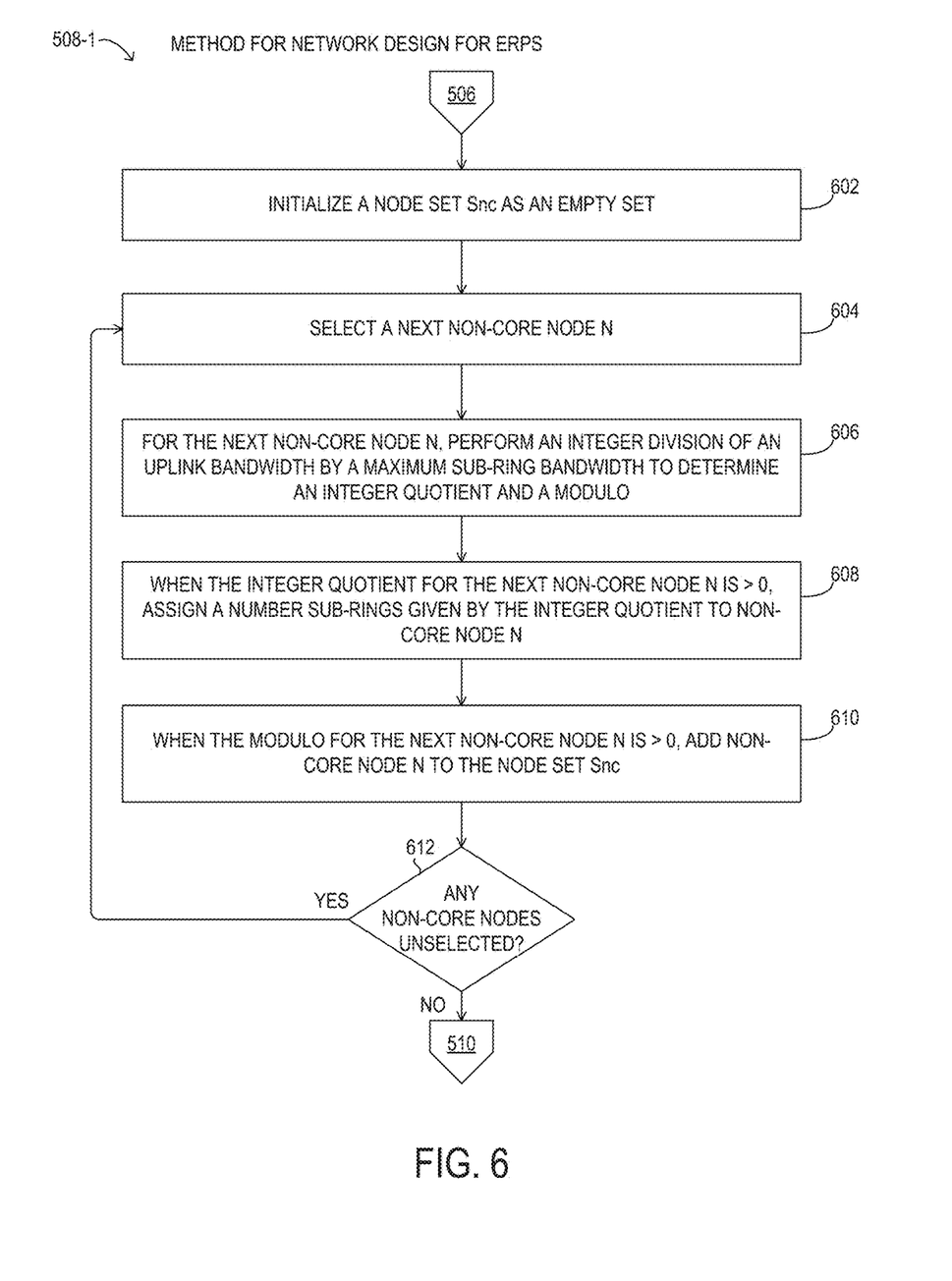
FIG. 6 is a flow chart of selected elements of a method for network design for ERP switching.

Referring now to FIG. 6, a flow chart of selected elements of an embodiment of method 508-1 for network design for ERP switching, as described herein, is depicted. In some embodiments, certain portions of method 508-1 may be executed by control plane 200 (see FIG. 2). It is noted that certain operations described in method 508-1 may be optional or may be rearranged in different embodiments. Method 508-1 may represent a particular embodiment of step 508 in method 500-1 shown in FIG. 5A.

Method 508-1 may begin at step 602 by initializing a node set Snc as an empty set. At step 604, a next non-core node N is selected. At step 606, for the next non-core node N, an integer division of an uplink bandwidth by a maximum sub-ring bandwidth may be performed to determine an integer quotient and a modulo. At step 608, when the integer quotient for the next non-core node N is greater than zero, a number of sub-rings given by the integer quotient may be assigned to non-core node N. At step 610, when the modulo for the next non-core node N is greater than zero, non-core node N is added to the node set Snc. At step 612 a decision is made whether any non-core nodes remain unselected. When the result of step 612 is YES and additional non-core nodes remain unselected, method 508-1 loops back to step 604. When the result of step 612 is NO and no non-core nodes remain unselected, method 508-1 proceeds to step 510 in method 500-1 in FIG. 5A.

Figure 7:
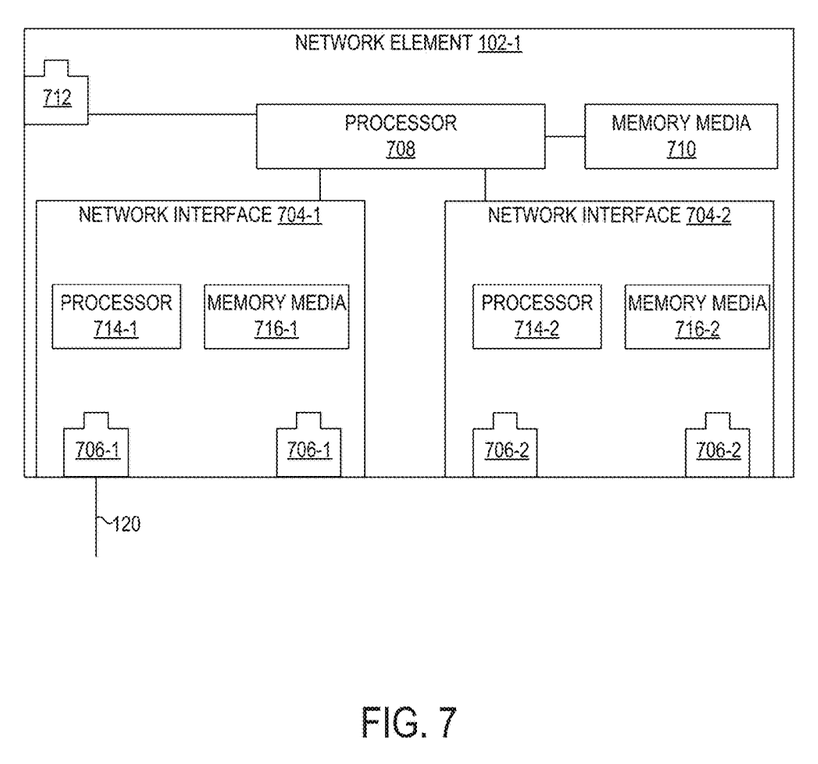
FIG. 7 is a block diagram of selected elements of an embodiment of a network element.

Referring now to FIG. 7, a block diagram is illustrated of selected elements of an embodiment of network element 102-1. Network element 102-1 is represented as a particular embodiment of network elements 102 in FIG. 1 for descriptive purposes. Network element 102-1, as shown, includes processor 708 and memory media 710, and external port 712, along with network interface 704-1 having ports 706-1 and network interface 704-2 having ports 706-2. External port 712 may be used by processor 708 to communicate with neighbor network elements (see FIG. 1). In certain implementations, processor 708 and memory media 710 may implement the network design methods for ERP switching disclosed herein.

As depicted in FIG. 7, network element 102-1 may include processor 708 and memory media 710 that may store instructions executable by processor 708. As shown, memory media 710 may represent volatile, non-volatile, fixed, and/or removable media, and may be implemented using magnetic and/or semiconductor memory. Memory media 710 is capable of storing instructions (i.e., code executable by processor 708) or data. Memory media 710 or at least a portion of contents of memory media 710 may be implemented as an article of manufacture comprising non-transitory computer readable memory media storing processor-executable instructions. Memory media 710 may store instructions including an operating system (OS), which may be any of a variety of operating systems, such as a UNIX variant, LINUX, a Microsoft Windows® operating system, or a different operating system.

In FIG. 7, network elements 102 are shown including at least one network interface 704, which provides a plurality of ports 706 that receive a corresponding transmission media 120 (see also FIG. 1). Ports 706 and transmission media 120 may represent galvanic or optical network connections or combinations thereof. Each network interface 704 may include any suitable system, apparatus, or device configured to serve as an interface between a network element 102 and transmission medium 120. Each network interface 704 may enable its associated network element 102 to communicate with other network elements 102 using any of a variety of transmission protocols or standards. Network interface 704 and its various components may be implemented using hardware, software, or any combination thereof. In certain embodiments, network interfaces 704 may include a network interface card. In various embodiments, network interfaces 704 may include a line card. Each port 706 may include a system, device or apparatus configured to serve as a physical interface between corresponding transmission medium 120 and network interface 704. In some embodiments, port 706 may comprise an Ethernet port. Although in FIG. 2 network interfaces 704 are shown with 2 instances of ports 706 for descriptive clarity, in different embodiments, network interfaces 704 may be equipped with different numbers of ports 706 (e.g., 4, 6, 8, 16 ports, etc.).

In various embodiments, network element 102 may be configured to receive data and route such data to a particular network interface 704 or port 706 based on analyzing the contents of the data or based on a characteristic of a signal carrying the data (e.g., a wavelength or modulation of the signal). In certain embodiments, network element 102 may include a switching element that may include a switch fabric (SWF).

As shown in FIG. 7, network interfaces 704 may include respective processors 714 and memory media 716, which may store and execute instructions and may be implemented in a similar manner as described above with respect to processor 708 and memory media 710, respectively. In various embodiments, processors 714 may execute internal instructions and operations, such as for packet routing and forwarding, and may be under control or supervision of processor 708.

As disclosed herein, a method and system for designing Ethernet ring protection services in a network is used to identify a major ring and sub-rings for a dual hub and spoke network architecture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for configuring networks, the method comprising:
based on topology information representing a network, the topology information comprising nodes and links between the nodes, identifying at least two core nodes and a major ring including the core nodes;
adding a virtual node V and virtual links to the topology information, the virtual node V connecting to the core nodes with the virtual links;
for each non-core node in the topology information, identifying two diverse paths from the non-core node to the virtual node V;
populating a node set $S_{nc}$ with at least some of the non-core nodes;
sorting the node set $S_{nc}$ according to a decreasing number hops of diverse paths to the virtual node V;
repeating until the node set $S_{nc}$ is an empty set:
selecting a first non-core node K in the node set $S_{nc}$ with the greatest number of hops of diverse paths to the virtual node V;
identifying a next sub-ring having two diverse paths from the first non-core node K to the virtual node V;
initializing a node set $P_{nc}$ with the non-core nodes shared by the node set $S_{nc}$ and the next sub-ring;
adding the first non-core node K to the next sub-ring;
removing the first non-core node K from the node set $S_{nc}$ and the node set $P_{nc}$; and
adding additional non-core nodes from the node set $P_{nc}$ to the next sub-ring until a termination condition for the next sub-ring is satisfied; and
causing the network to be configured with the major ring and the sub-rings.

2. The method of claim 1, wherein causing the network to be configured further comprises:
configuring the major ring and the sub-rings for Ethernet ring protection switching.

3. The method of claim 1, wherein the termination condition comprises at least one of:
determining that a maximum number of non-core nodes for a sub-ring has been reached for the next sub-ring;
determining that a maximum sub-ring bandwidth has been reached for the next sub-ring; and
determining that the node set $P_{nc}$ is empty.

4. The method of claim 1, wherein populating the node set $S_{nc}$ with at least some of the non-core nodes further comprises:
initializing the node set $S_{nc}$ as an empty set; and
repeating until no non-core nodes remain unselected from the topology information:
from the topology information, selecting a next non-core node N;
for the next non-core node N, perform an integer division of an uplink bandwidth by a maximum sub-ring bandwidth to determine an integer quotient and a modulo;
when the integer quotient for the next non-core node N is greater than zero, assign a number of quotient subrings to N; and
when the modulo for the next non-core node N is greater than zero, add N to the node set $S_{nc}$.

5. A network management system comprising:
a processor; and
non-transitory computer readable memory media accessible to the processor, wherein the memory media store instructions executable by the processor for:
based on topology information representing a network, the topology information comprising nodes and links between the nodes, identifying at least two core nodes and a major ring including the core nodes;
adding a virtual node V and virtual links to the topology information, the virtual node V connecting to the core nodes with the virtual links;
for each non-core node in the topology information, identifying two diverse paths from the non-core node to the virtual node V;
populating a node set $S_{nc}$ with at least some of the non-core nodes;
sorting the node set $S_{nc}$ according to a decreasing number hops of diverse paths to the virtual node V;
repeating until the node set $S_{nc}$ is an empty set:
selecting a first non-core node K in the node set $S_{nc}$ with the greatest number of hops of diverse paths to the virtual node V;
identifying a next sub-ring having two diverse paths from the first non-core node K to the virtual node V;
initializing a node set $P_{nc}$ with the non-core nodes shared by the node set $S_{nc}$ and the next sub-ring;
adding the first non-core node K to the next sub-ring;
removing the first non-core node K from the node set $S_{nc}$ and the node set $P_{nc}$; and
adding additional non-core nodes from the node set $P_{nc}$ to the next sub-ring until a termination condition for the next sub-ring is satisfied; and causing the network to be configured with the major ring and the sub-rings.

6. The network management system of claim 5, wherein causing the network to be configured further comprises:
configuring the major ring and the sub-rings for Ethernet ring protection switching.

7. The network management system of claim 5, wherein the termination condition comprises at least one of:
determining that a maximum number of non-core nodes for a sub-ring has been reached for the next sub-ring;
determining that a maximum sub-ring bandwidth has been reached for the next sub-ring; and
determining that the node set $P_{nc}$ is empty.

8. The network management system of claim 5, wherein populating the node set $S_{nc}$ with at least some of the non-core nodes further comprises:
initializing the node set $S_{nc}$ as an empty set; and
repeating until no non-core nodes remain unselected from the topology information:
from the topology information, selecting a next non-core node N;
for the next non-core node N, perform an integer division of an uplink bandwidth by a maximum sub-ring bandwidth to determine an integer quotient and a modulo;
when the integer quotient for the next non-core node N is greater than zero, assign a number of quotient subrings to N; and
when the modulo for the next non-core node N is greater than zero, add N to the node set $S_{nc}$.

9. A network element, comprising:
a processor; and
non-transitory computer readable memory media accessible to the processor, wherein the memory media store instructions executable by the processor for:
based on topology information representing a network, the topology information comprising nodes and links between the nodes, identifying at least two core nodes and a major ring including the core nodes;
adding a virtual node V and virtual links to the topology information, the virtual node V connecting to the core nodes with the virtual links;
for each non-core node in the topology information, identifying two diverse paths from the non-core node to the virtual node V;
populating a node set $S_{nc}$ with at least some of the non-core nodes;

sorting the node set $S_{nc}$ according to a decreasing number hops of diverse paths to the virtual node V;
repeating until the node set $S_{nc}$ is an empty set:
selecting a first non-core node K in the node set $S_{nc}$ with the greatest number of hops of diverse paths to the virtual node V;
identifying a next sub-ring having two diverse paths from the first non-core node K to the virtual node V;
initializing a node set $P_{nc}$ with the non-core nodes shared by the node set $S_{nc}$ and the next sub-ring;
adding the first non-core node K to the next sub-ring;
removing the first non-core node K from the node set $S_{nc}$ and the node set $P_{nc}$; and
adding additional non-core nodes from the node set $P_{nc}$ to the next sub-ring until a termination condition for the next sub-ring is satisfied; and
causing the network to be configured with the major ring and the sub-rings.

10. The network element of claim 9, wherein causing the network to be configured further comprises:
configuring the major ring and the sub-rings for Ethernet ring protection switching.

11. The network element of claim 9, wherein the termination condition comprises at least one of:
determining that a maximum number of non-core nodes for a sub-ring has been reached for the next sub-ring;
determining that a maximum sub-ring bandwidth has been reached for the next sub-ring; and
determining that the node set $P_{nc}$ is empty.

12. The network element of claim 9, wherein populating the node set $S_{nc}$ with at least some of the non-core nodes further comprises:
initializing the node set $S_{nc}$ as an empty set; and
repeating until no non-core nodes remain unselected from the topology information:
from the topology information, selecting a next non-core node N;
for the next non-core node N, perform an integer division of an uplink bandwidth by a maximum sub-ring bandwidth to determine an integer quotient and a modulo;
when the integer quotient for the next non-core node N is greater than zero, assign a number of quotient subrings to N; and
when the modulo for the next non-core node N is greater than zero, add N to the node set $S_{nc}$.

* * * * *